US008499194B2

(12) United States Patent
Verdun et al.

(10) Patent No.: US 8,499,194 B2
(45) **Date of Patent: *Jul. 30, 2013**

(54) INFORMATION HANDLING SYSTEM FORCED ACTION COMMUNICATED OVER AN OPTICAL INTERFACE

(75) Inventors: Gary Verdun, Georgetown, TX (US); William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/952,464

(22) Filed: Nov. 23, 2010

(65) Prior Publication Data

US 2012/0110381 A1 May 3, 2012

Related U.S. Application Data

(63) Continuation-in-part of application No. 12/913,029, filed on Oct. 27, 2010.

(51) Int. Cl.
*G06F 11/30* (2006.01)

(52) U.S. Cl.
USPC ............................................ 714/24; 714/23

(58) Field of Classification Search
USPC ................................................... 714/23, 24
See application file for complete search history.

(56) References Cited

U.S. PATENT DOCUMENTS

| | | | | |
|---|---|---|---|---|
| 6,583,899 | B1 | 6/2003 | Casanova et al. | |
| 7,620,320 | B2 | 11/2009 | Mayes et al. | |
| 7,751,715 | B2 | 7/2010 | Takami et al. | |
| 2007/0042637 | A1 * | 2/2007 | Bell et al. | 439/502 |
| 2008/0244097 | A1 * | 10/2008 | Candelore et al. | 710/5 |
| 2010/0028004 | A1 * | 2/2010 | Nishino | 398/79 |
| 2010/0118193 | A1 * | 5/2010 | Boyden et al. | 348/554 |
| 2011/0151784 | A1 * | 6/2011 | Ohkita | 455/41.2 |

* cited by examiner

*Primary Examiner* — Chae Ko
(74) *Attorney, Agent, or Firm* — Terrile, Cannatti, Chambers & Holland, LLP; Robert W. Holland

(57) ABSTRACT

A forced power down signal issues from an I/O device to an information handling system through an optical interconnect if the information handling system fails to power down in response to a normal power down message. A 100% duty cycle signal issues from an optical interface at the I/O device and is detected by an optical interface of the information handling system, which issues a command to force a power down of the information handling system in response to the forced power down signal.

20 Claims, 2 Drawing Sheets

INFORMATION HANDLING SYSTEM FORCED ACTION COMMUNICATED OVER AN OPTICAL INTERFACE

This application is a continuation-in-part of co-pending application Ser. No. 12/913,029, filed Oct. 27, 2010, entitled "Information Handling System Forced Action Communicated Over An Optical Interface" and naming Gary Verdun and William F. Sauber as inventors, which is incorporated herein by reference in its entirety.

BACKGROUND OF THE INVENTION

1. Field of the Invention

The present invention relates in general to the field of information handling system input/output devices, and more particularly to an information handling system forced action communicated over an optical interface.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One driving force behind advancements in information handling systems is the improved bandwidth for communicating information available using newer communication media and protocols. One example of such an improvement is the use of optical interconnects to send information between components of an information handling system. Improved bandwidth and decreasing costs for optical interconnects have made it commercially feasible to separate processing devices from input/output (I/O) devices. Information handling systems are divided into cable docking systems or split systems where the user interface portion of an information handling system is separated from the processing portion. For example, an information handling system having a processor, RAM and non-volatile storage are placed in a "black box" chassis out of sight and then interfaced with deployed I/O devices, such as a keyboard and display, through a high bandwidth optical interconnect. The optical interconnect sends information as light signals through a fiber optical cable. Specific protocols used to communicate between I/O devices and the information handling system are tunneled within the fiber optic cable using the optical interconnect's protocol. For example, the DisplayPort or other similar protocols transfer information between a graphics controller of the information handling system and a display with the DisplayPort information tunneled through the protocol of the optical interface. As another example, physical system links that would normally be sent as electronic interrupts and electronic signals are sent as logical commands with optical signals and recreated at the receiving device using processing resources.

Although information handling systems have multiple layers of redundancy built into them to help prevent failures, situations do still arise where an information handling system fails to a "hung" state in which the system is not responsive to normal I/O device inputs. Typically, information handling systems have simple hardware devices that allow an end user to force a power down or reset of the system when the system is not responding. An example of such a situation is a hung operating system that prevents code from executing on the information handling system to perform a normal power down sequence. In conventional information handling systems, the power switch of the information handling system typically includes a hardware mechanism that forces a power down independent of software executing on the processor, such as by sending a GPIO or other physical bit signal to hardware or firmware, such as the system BIOS. In order to distinguish a power switch input that commands a normal power down versus a forced shut down, the power switch of a conventional information handling system typically does not send the signal for a forced shutdown until the end user has held the power switch in the off position for an extended time period, such as a time period of at least four seconds.

SUMMARY OF THE INVENTION

Therefore a need has arisen for a system and method which supports communication of a forced shutdown from an I/O device to an information handling system having a hung processor.

In accordance with the present invention, a system and method are provided which substantially reduce the disadvantages and problems associated with previous methods and systems for communicating a forced shutdown to an information handling system. A host optical interface monitors signals across an optical cable to detect a forced power down indication from a remote I/O device. If a forced power down indication is detected, the host optical interface issues a signal for a forced hardware power down.

More specifically, an information handling system having processing components disposed in a chassis interacts with remote I/O devices through an optical interconnect having an optical interface at the chassis, and optical interface at the I/O device and an optical cable to communicate optical signals between the optical interfaces. The remote I/O device, such as a display, includes a power selector that an end user asserts to alter the power state of the information handling system. The I/O device optical interface sends power selector assertions as messages through the optical cable to the optical interface at the information handling system chassis, which detects the messages and forwards the power selector assertion to core logic of the information handling system as if the power selector assertion was made at a power selector of the chassis. If the I/O device optical interface fails to detect a response from the host information handling system within a predetermined time, such as a change of power state within four seconds, the I/O device issues a forced power down message by sending a 100% duty cycle signal through the optical cable. Similarly, if the I/O device optical interface detects assertion of the power selector for a predetermined time, such as four seconds, the I/O device optical interface issues the forced power down signal. The optical interface at the information handling system detects the forced power down signal and issues a hardware power down signal to core logic as if the power selector at the information handling was asserted and held for four seconds.

The present invention provides a number of important technical advantages. One example of an important technical advantage is that a forced shutdown of an information handling system is accomplished from a remote I/O device in a manner familiar to an end user by pushing and holding the button to an off position at the I/O device. If the information handling system fails to detect the off indication through normal operating system or other processing routines, hardware at the I/O device sends a forced off signal through the interface that is detectable by hardware at the information handling system to force a system power down. In the example embodiment of a remote I/O device interfacing with an information handling system through an optical interconnect, the interconnect initiates an optical signal with a 100% duty cycle that is readily detectable at interconnect hardware of the information handling system and converted to a power off signal for the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Forced shutdown of an information handling system from a remote I/O device is triggered through an optical interconnect with a forced shutdown signal sent and detected by optical interconnect interfaces at the I/O device and information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
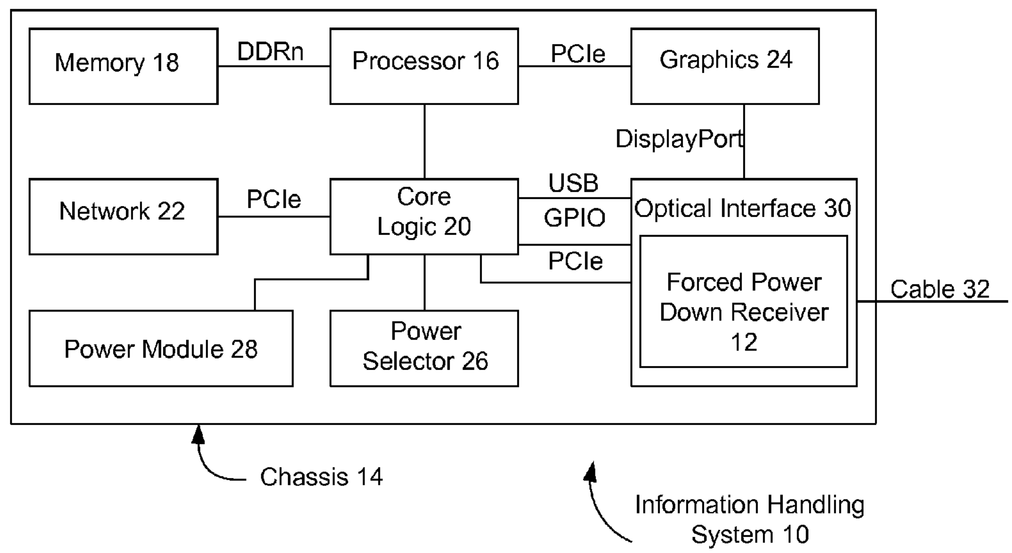
FIG. 1 depicts a circuit block diagram of an information handling system having an optical interconnect with a forced power down receiver.

Referring now to FIG. 1, a circuit block diagram depicts an information handling system 10 having an optical interconnect with a forced power down receiver 12. Information handling system 10 is built in a chassis 14 that has processing components that cooperate to process information. For example, a processor 16 executes instructions with memory 18 to process information. Visual information for creating visual images is provided to a graphics controller 24, which creates pixel based information to generate a visual image at a display. An operating system executing on processor 16 supports the execution of applications by coordinating hardware resource in combination with core logic 20. Core logic 20 includes firmware, such as a BIOS and a chipset, that manages physical devices, such as I/O devices that interact with an end user. A network interface 22 interacts with core logic 20 to support communication with an external network, such as a local area network.

Core logic 20 receives inputs from a power selector 26 and applies power selection inputs with a power module 28 to set an appropriate power state of information handling system 10. For example, a selection of the power button will cause SMI or SCI logic to indicate a system request to a sleep state or, if the system is in a sleep state, to a wake state. If power selector 26 is pressed for more than four seconds, an unconditional transition to an off state is commanded regardless of the state of the system at the pressing of the power selector. The off state is enforced with an internal pull up resistor. During normal operations controlled by an operating system, reduced power states including the off state, are commanded by user inputs through the operating system that are communicated to power module 28 for execution. Commanding a power down through the operating system offers the advantage of an orderly shutdown of applications running on processor 16 before power is switched off, however, the option for a forced shutdown by pressing and holding power selector 26 ensures that a shutdown is available if the processor is hung and thus unable to execute an end user input for a normal power down.

Chassis 14 is separated from I/O devices, such as a display and keyboard, so that communication is accomplished with an optical interconnect having an optical interface 30 and an optical cable 32. In alternative embodiments, other types of high bandwidth interconnects may be used. Optical interface 30 receives visual information from graphics controller 24 with the DisplayPort protocol and receives other information from core logic 20 through the PCIe and USB protocols. Optical interface 30 tunnels each set of information in their respective protocol through an optical interconnect protocol and sends the information through cable 32 to I/O devices. The large bandwidth of optical cable 32 allows I/O devices to operate separate from chassis 14, which can be placed out of the way.

Figure 2:
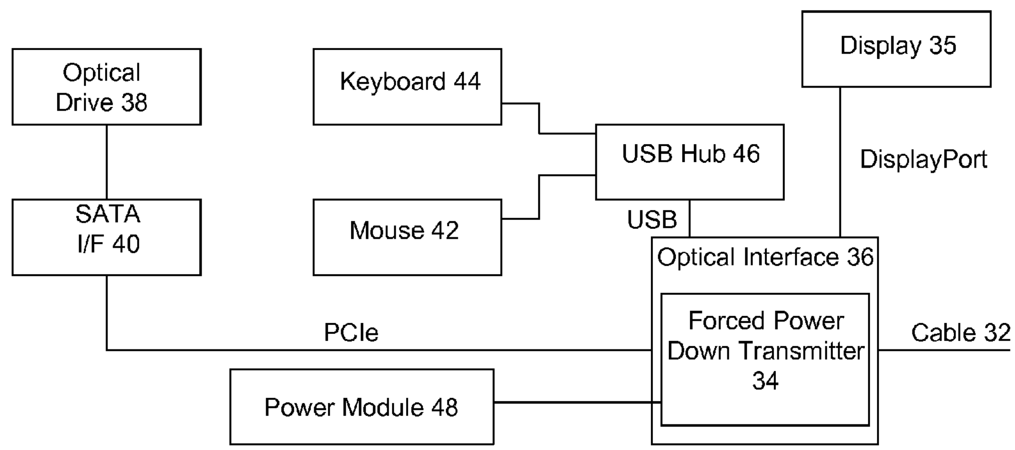
FIG. 2 depicts a circuit block diagram of an I/O device having an optical interconnect with a forced power down transmitter.

Referring now to FIG. 2, a circuit block diagram depicts an I/O device having an optical interconnect with a forced power down transmitter 34. For example, the I/O device is a display 35 that presents information provided from graphics processor 24 and has ports to interact with other I/O devices. Information sent from chassis 14 tunneled in the optical interconnect protocol is received by the remote optical interface 36 and the tunneled information is extracted from the optical interface protocol for use in the underlying system protocol, such as PCIe or USB. Remote optical interface 36 also tunnels information from the I/O device to chassis 14, such as information from an optical drive 38 sent through a SATA interface 40 in PCIe protocol or information from a mouse 42 or keyboard 44 sent through a USB hub 46. A power selector 48 associated with optical interface 36 accepts end user power selections at the remote I/O device in a manner similar to the power selector 26 located at chassis 14. Power selector inputs and other system indicators, such as LED indicator information, are communicated between the I/O device and chassis 14 over the optical interconnect as messages tunneled within the optical interconnect protocol. For example, a message is sent indicating assertion of the power selector and deassertion of the power selector so that the operating system can apply the correct power state.

In operation, inputs at power selector 48 are managed by logic executing on optical interface 30 at chassis 14 and optical interface 36 at I/O device 35. Upon assertion of power selector 48 at I/O device 35 a message is sent by optical interface 36 to optical interface 30 indicating assertion of power selector 48 and de-assertion of power selector 48 when it is released. Optical interface 30 recognizes the message for assertion of power selector 48 and in response asserts a hardware power selection to core logic 20 as if the power selector 26 was selected, such as by issuing a GPIO signal. Core logic 20 performs a normal timing sequence to determine the length of time that the power selector 48 is selected until a de-assertion is received at optical interface 30. If no de-assertion is detected after four seconds, then a forced power down is commanded by core logic 20. Optical interface 36 of I/O device 35 monitors messages provided from information handling system 10 to detect a de-assertion of power at information handling system 10 or a host shutdown after a period of five seconds. If a power down of information handling system 10 does not occur in response to the input at power selector 48, then a forced power down transmitter 34 sends a 100% duty cycle by illumination through cable 32 of light on constant with no scramble or encoding. Optical interface 30 has a forced power down receiver 12 that monitors for a 100% duty cycle signal and, if one is received, asserts in response a hardware power selector forced power down signal to core logic 20. The 100% duty cycle signal is asserted until power removal occurs so that a forced shutdown is detected and enforced even if only optical interface 30 remains operational. In alternative embodiments, alternative signals to the 100% duty cycle may be used to indicate a forced power down.

In summary, logic operating on optical interface 36, such as firmware executing on a controller, detects inputs at power selector 48 and sends messages for the inputs to optical interface 30. Optical interface 30 receives the messages and applies the messages to recreate the physical bits represented by the messages for use by core logic 20 as if power selector 26 had received the inputs. Thus, inputs at power selector 48 may be forwarded to the operating system or acted upon by core logic 20. Optical interface 36 monitors cable 32 for messages in response to the input at power selector 48 and, if an input is not received in a predetermined time, outputs a forced power down signal with forced power down transmitter 34, such as 100% duty cycle. A forced power down signal is also issued if an end user presses and holds power selector 48 for a predetermined time period, such as four seconds. Forced power down receiver 12 at optical interface 30 monitors signals along cable 32 and issues a forced power down signal if 100% duty cycle is detected at cable 32. Core logic 20 responds to the forced power down signal as if power selector 26 is pressed and held for a time period that indicates a forced power down.

Figure 3:
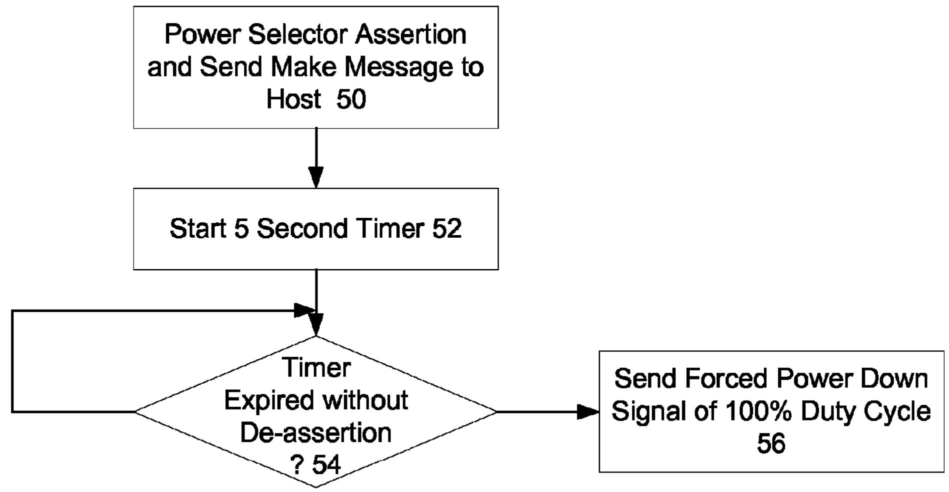
FIG. 3 depicts a flow diagram of a process for sending a forced power down signal from an I/O device to an information handling system.

Referring now to FIG. 3, a flow diagram depicts a process for sending a forced power down signal from an I/O device to an information handling system. The process starts at step 50 with assertion of the power selector at the I/O device and sending of a message to indicate the assertion. At step 52, a five second timer is initiated to track how long the power selector is asserted. At step 54 a determination is made of whether the five second timer has passed without a deassertion of the power selector. After the five second timer expires without a deassertion of the power selector, the process continues to step 56 to issued a forced power down signal. If a deassertion of the power selector is detected prior to time out of the five second timer, a message of the deassertion is sent and the process ends.

Figure 4:
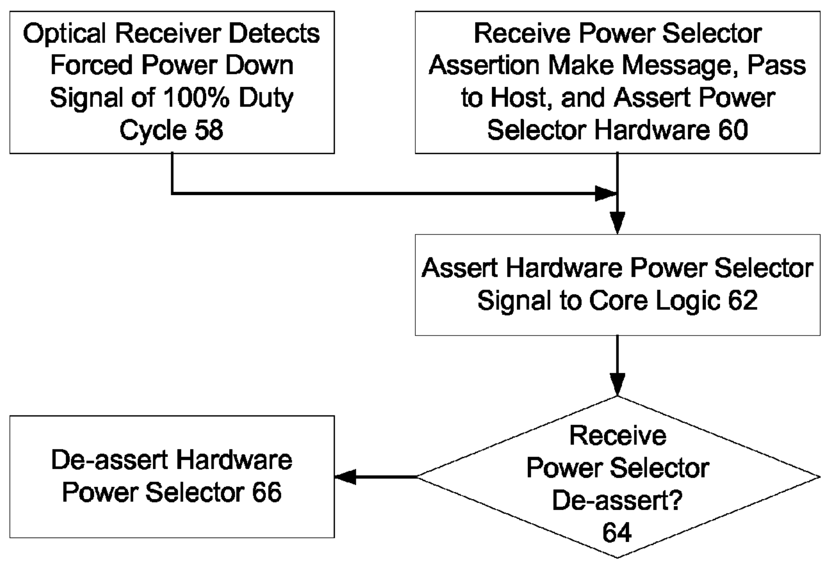
FIG. 4 depicts a flow diagram of a process for receiving a forced power down signal at an information handling system from an I/O device.

Referring now to FIG. 4, a flow diagram depicts a process for receiving a forced power down signal at an information handling system from an I/O device. The process starts at step 58 with reception at the optical interface of a signal having 100% duty cycle or at step 60 with reception of a make message of a power selector assertion that is passed to the host system and assertion of the power selector hardware. At step 62 in response to the signal sent from the remote I/O device, a hardware power selector assertion is provided to core logic as if made at the host system. At step 64 a determination is made of whether a message is received from the remote I/O device of a deassertion of the power selector. If not, then the hardware power down signal remains asserted to power down the host system. If yes, the process continues to step 66 to deassert the hardware power down.

Although the present invention has been described in detail, it should be understood that various changes, substitutions and alterations can be made hereto without departing from the spirit and scope of the invention as defined by the appended claims.

What is claimed is:

1. An information handling system comprising:

a processor operable to process information;

a power module operable to power up and power down the processor;

an Input/Output (I/O) device operable to communicate information with the processor;

a cable operable to transmit the information between the processor and I/O device;

a first physical interface interfaced with the I/O device and the cable, the first physical interface operable to generate signals for communication of the information through the cable and to read signals through the cable;

a second physical interface interfaced with the processor and the cable, the second physical interface operable to generate signals for communication of information through the cable and to read signals through the cable; and a power selector integrated with the I/O device operable to detect a power down indication;

wherein the I/O device is operable to respond to the power down indication by issuing a forced power down signal with the first physical interface through the cable to the second physical interface, the second physical interface operable to receive the forced power down signal and to command a power down at the power module in response to the forced power down signal.

2. The information handling system of claim 1 wherein the cable comprises an optical interconnect that communicates information with light signals.

3. The information handling system of claim 1 wherein the forced power down signal comprises 100% duty cycle sent through the optical interconnect.

4. The information handling system of claim 3 wherein the first physical interface issues the forced power down signal after a failure of the second physical interface to respond to a normal power down signal tunneled through the optical interconnect within a predetermined time period.

5. The information handling system of claim 3 wherein the first physical interface issues the forced power down signal after a failure to power down at the processor in response to a normal power down signal from the I/O device.

6. The information handling system of claim 5 wherein the I/O device comprises a display operable to present information.

7. The information handling system of claim 5 wherein the I/O device comprises a keyboard.

8. The information handling system of claim 5 wherein the second physical interface commands power down with a General Purpose Input/Output (GPIO) issued directly to the power module.

9. A method for communicating a power down signal from an Input/Output (I/O) device to an information handling system, the method comprising:

communicating a power down from the I/O device through a cable to the information handling system;

detecting a predetermined condition associated with the power down;

in response to the detecting, sending a forced power down signal from the I/O device through the cable; and in response to the forced power down signal, commanding a power down of the information handling system with a physical interface of the cable to the information handling system.

10. The method of claim 9 wherein the predetermined condition comprises a failure of the information handling system to respond to the power down indication in a predetermined time period.

11. The method of claim 9 wherein the predetermined condition comprises a failure of the information handling system to power down within a predetermined time of the communicating of the power down.

12. The method of claim 9 wherein the predetermined condition comprises activation of a power selector at the I/O device for a predetermined time period.

13. The method of claim 9 wherein the cable comprises an optical interconnect.

14. The method of claim 13 wherein the forced power down signal comprises illumination of light at the optical interconnect with a predetermined pattern.

15. The method of claim 14 wherein the predetermined pattern comprises a 100% duty cycle.

16. The method of claim 9 wherein communicating the power down from the I/O device through a cable to the information handling system further comprises tunneling the power down through an optical interconnect using an optical interconnect protocol.

17. A system for communicating a forced power down signal from a first device to a second device, the system comprising:

a first physical interface associated with the first device and operable to communicate information through an optical cable;

a second physical interface associated with the second device and operable to communicate information through the optical cable;

a forced power down transmitter associated with the first physical interface and operable to send a forced power down signal through the optical cable if a predetermined condition is detected; and a forced power down receiver associated with the second physical interface and operable to send a power down command to the second device if the forced power down signal is detected.

18. The system of claim 17 wherein the forced power down signal comprises illumination from the first physical interface at 100% duty cycle.

19. The system of claim 17 wherein the predetermined condition comprises a failure by the second device to respond to a normal power down message tunneled from the first physical interface.

20. The system of claim 17 wherein the predetermined condition comprises a failure by the second device to power down within a predetermined time after a normal power down message tunneled from the first physical interface.

* * * * *